United States Patent [19]

Wurtz

[11] Patent Number: 4,658,891
[45] Date of Patent: Apr. 21, 1987

[54] METHOD AND APPARATUS FOR THERMALLY PROCESSING VISCOUS, SHEAR SENSITIVE MATERIALS

[75] Inventor: William O. Wurtz, Paramus, N.J.

[73] Assignee: Willow Technology, Inc., Paramus, N.J.

[21] Appl. No.: 678,761

[22] Filed: Dec. 5, 1984

Related U.S. Application Data

[63] Continuation-in-part of Ser. No. 568,902, Jan. 5, 1984.

[51] Int. Cl.⁴ .............................................. F28F 5/04
[52] U.S. Cl. ..................................... 165/92; 366/144; 34/40; 34/182
[58] Field of Search ...................... 34/39, 68, 179, 180, 34/181, 182, 183, 40; 165/181, 92; 366/144, 301

[56] References Cited

U.S. PATENT DOCUMENTS

| | | | |
|---|---|---|---|
| 3,941,357 | 3/1976 | Wurtz | 366/301 |
| 4,257,172 | 3/1981 | Townsend | 34/68 |
| 4,276,701 | 7/1981 | Takacs et al. | 34/179 X |
| 4,430,057 | 2/1984 | Hoover et al. | 34/179 X |
| 4,492,039 | 1/1985 | Chao et al. | 34/68 X |
| 4,492,043 | 1/1985 | Zannoni | 34/39 |

FOREIGN PATENT DOCUMENTS

| | | | |
|---|---|---|---|
| 896352 | 1/1982 | U.S.S.R. | 34/39 |
| 1020730 | 5/1983 | U.S.S.R. | 34/39 |

Primary Examiner—Albert W. Davis, Jr.
Assistant Examiner—Peggy A. Neils
Attorney, Agent, or Firm—Collard, Roe & Galgano

[57] ABSTRACT

There is provided a thermal processor and method for thermally processing non-Newtonian, shear sensitive, viscous materials which are difficult-to-dry and difficult-to-handle, in particular dewatered waste water sludge from industrial plants such as metal hydroxide sludge from surface finishing and plating operations. The thermal processor includes a container having two parallel shafts disposed longitudinally therein for counter-rotational movement therebetween, a plurality of working tools attached by radially extending arms to said shafts and extending towards and substantially up to the sidewalls of the container. The parallel shafts are spaced from each other such that the paths of travel of the respective working tools attached to the shafts overlap therebetween in an area of material interaction. The working tools are double wedge shaped having two substantially triangular sides converging toward each other at their connection to the shaft and converging toward each other to define a forward edge which forms the leading edge of the tool. The bottom surfaces of the tools are recessed from the bottom edges of the triangularly shaped sides. A radiant heater is disposed in communication with the container of the thermal processor to uniformly heat all of the sludge particles in the material being processed as the material is impelled and divided in the free space of the container.

7 Claims, 7 Drawing Figures

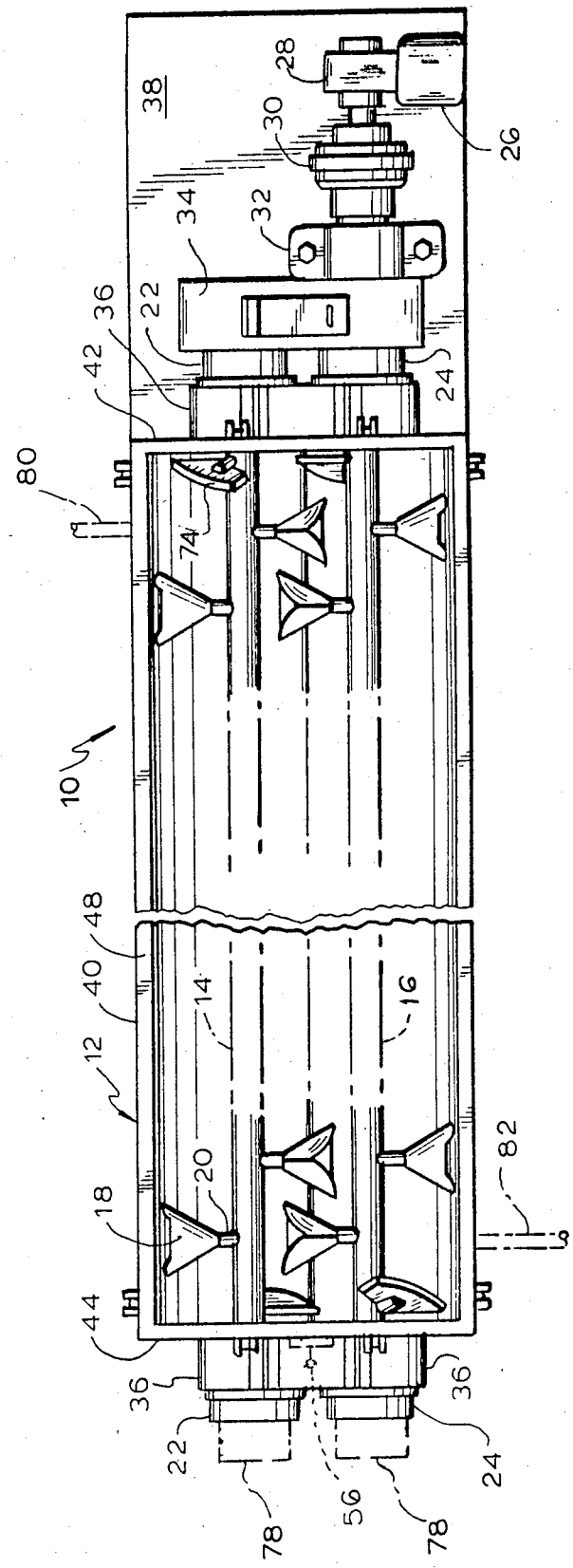

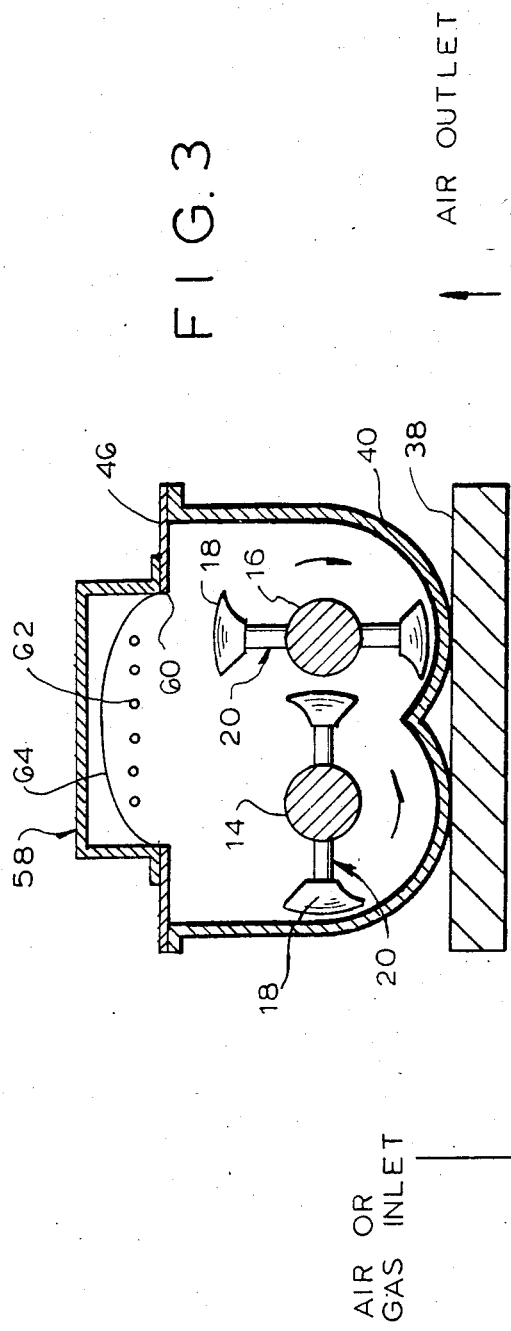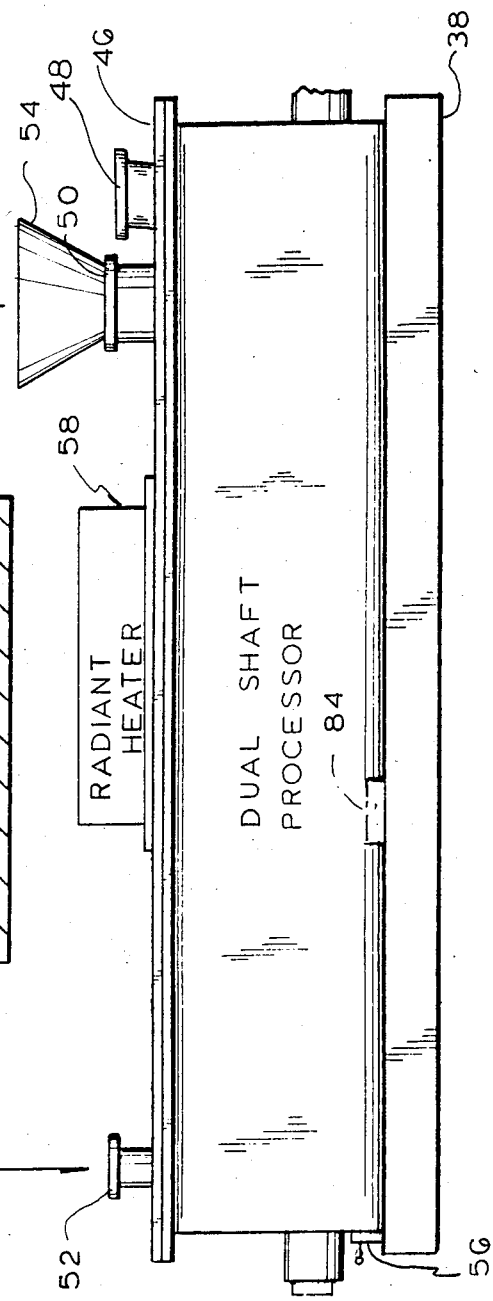

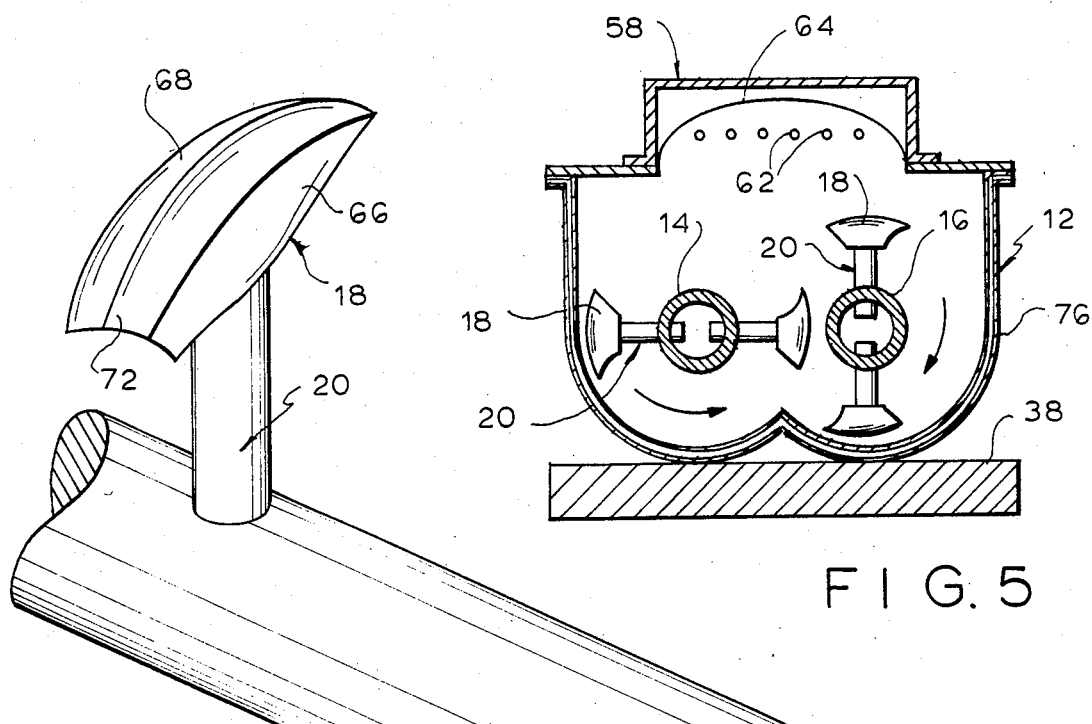
FIG. 5
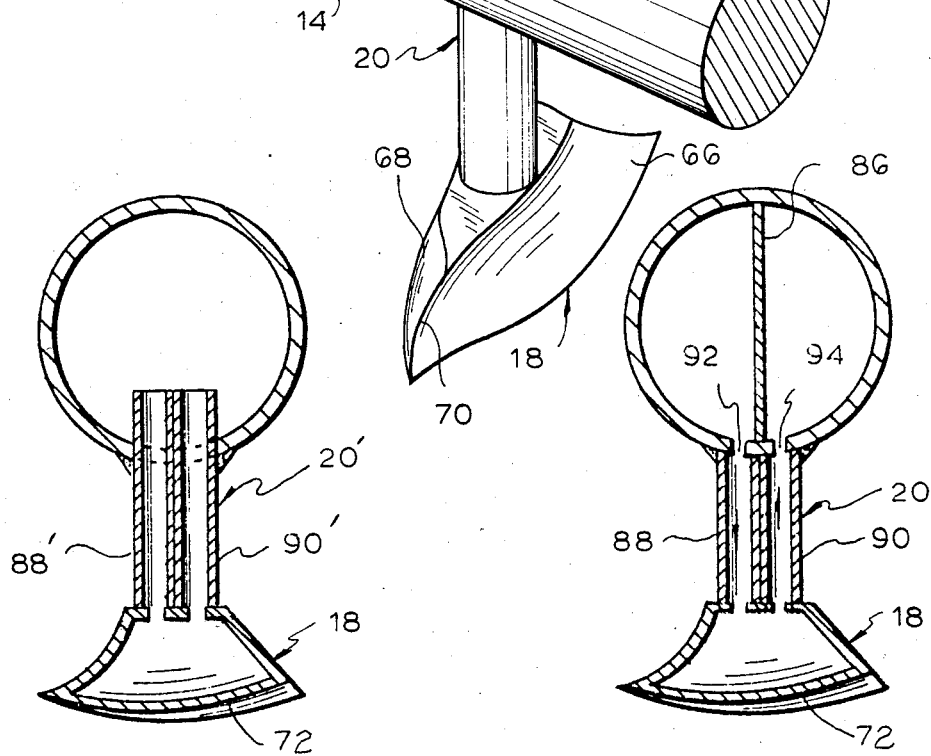
FIG. 4
FIG. 7
FIG. 6

METHOD AND APPARATUS FOR THERMALLY PROCESSING VISCOUS, SHEAR SENSITIVE MATERIALS

This application is a continuation-in-part application of U.S. Ser. No. 568,902, filed Jan. 5, 1984, for "METHOD AND APPARATUS FOR THERMALLY PROCESSING VISCOUS, SHEAR SENSITIVE MATERIALS", the disclosure of which is herein incorporated by reference.

The present invention relates to a method and apparatus for thermally processing viscous, shear sensitive materials. More specifically, the present invention relates to a method and a thermal processor which is well suited for thermally processing non-Newtonian, heavy, tacky, shear sensitive, viscous materials which exhibit thixotropic characteristics when subjected to shear forces.

In my earlier filed application referenced above, I have disclosed a thermal processor for thermally processing non-Newtonian, viscous, shear sensitive materials which substantially provides a uniform rate of shear to such materials and comprises an elongated jacketed container including a pair of parallel, horizontally spaced-apart, rotating, hollow shafts disposed longitudinally in the container and a plurality of hollow working tools of particular design mounted on the shafts so that the hollow spaces of the tools and the shafts are in communication. The tools are so mounted that the paths of travel of the tools on one shaft are in proximity to the paths of travel of the tools mounted on the other shaft so as to create an overlapping zone of interaction therebetween for rapid division of the material being processed. A heat transfer medium is supplied to the jacketed container, the hollow shafts and the hollow tools so as to effectively and efficiently thermally process the material in the container.

The apparatus disclosed in my earlier filed application has been found to be very effective in the thermal processing of non-Newtonian, shear sensitive, viscous materials. As disclosed therein, non-Newtonian, shear sensitive, viscous materials are materials whose viscosity changes or increases when subject to non uniform shear stress as found in thermal processors of the type the present application is concerned with. In particular, the viscosity of such materials increases when subjected to shear. Especially difficult-to-dry and difficult-to-handle materials, particularly materials such as dewatered waste water sludge from industrial plants such as metal hydroxide sludge from surface finishing and plating operations, present very difficult problems for thermal processors. Such materials are often discharged from sludge dewatering equipment as a filter cake containing from 20-40% dry solids. Transportation of such sludge materials to dumping areas is costly and it is therefore desirable to dry the sludge prior to such transportation. However, due to its thixotropic characteristics, the sludge reverts from a firm cake to a heavy, viscous, hard-to-handle paste when shear force is applied to the sludge cake during thermal processing thereof. As a result of this characteristic, attempts to dry this material heretofore have resulted in a more viscous material as water or solvents are evaporated. With prior art processors, the constantly increasing viscosity of such material resulted in failure of the drying apparatus. Although the apparatus disclosed in my earlier filed application referenced above is effective for thermally processing such materials, it is nevertheless a higher initial capital equipment cost and less efficient with respect to metal hydroxide applications.

It is to be noted that there are two important limiting conditions for efficient drying: the rate of heat transfer to the material particles and the mass transfer of moisture from within the material particles to the particle surfaces. In order to satisfy these conditions, it is necessary to continually expose the surface area of the material to heat energy at a high rate. It is also necessary to cause the diffusion of water vapor as a film at the interface of the material and the gas or air in the thermal processor to reduce the partial pressure at this interface so as to enhance the mass transfer within the material. These conditions are extremely difficult to attain with the non-Newtonian, shear sensitive, highly viscous sludge materials above described, particularly in view of the changing characteristics of the material during processing.

It is, therefore, an object of the present invention to provide a thermal processor for the thermal processing of difficult-to-dry and difficult-to-handle materials, particularly dewatered waste water sludge from industrial plants such as metal hydroxide sludge from surface finishing and plating operations, which are non-Newtonian, shear sensitive, viscous materials, said thermal processor being efficient for drying the materials for process or disposal purposes at a relatively low cost.

This object, as well as others which will hereinafter become apparent, is accomplished in accordance with the present invention by the provision of a thermal processor for thermally processing non-Newtonian, shear sensitive, viscous materials which are difficult-to-handle and difficult-to-dry, particularly dewatered waste water sludge from industrial plants such as metal hydroxide sludge from surface finishing and plating operations which has thixotropic characteristics so that the sludge reverts from a firm cake to a heavy, viscous, hard-to-handle paste when shear force is applied to the sludge cake during processing or drying. The thermal processor of the present invention includes an elongated container or vessel having two parallel, horizontally spaced-apart shafts disposed longitudinally therein for counter-rotational movement therebetween. The working tools, which are attached to the shafts by radially extending arms, extend toward and substantially up to the sidewalls of the container. The working tools are double wedge shaped having two substantially triangularly shaped sides converging toward each other at their connection to the shafts and converging toward each other to define a forward or leading edge in the direction of rotation of the tool. The bottom surfaces of the tools are recessed from the bottom edges of the triangularly shaped sides. The shafts of the dual shaft arrangement are arranged so that the paths of the double wedge working tools of each shaft overlap so that the tools mounted on one shaft come in proximity to the shaft of the second set of working tools and vice versa. This creates an overlapping zone of interaction for extremely rapid division of the material, exposing new surface area of the material as well as impelling the material at high peripheral speed through the processor with uniform shear. Heat is supplied to the material being processed by means of the radiant energy of electric or gas operated radiant heaters or the electromagnetic waves of the electromagnetic spectrum which produce heat upon being absorbed by the materials being processed.

The radiant heater thermal processor can also be supplemented by utilization of a purge of hot gas, such as air, through the container of the thermal processor. The hot gas is admitted at the charging end of the thermal processor and vented through the discharge end with a conventional cyclone separator used in conjunction with the vent to separate the gas from the dried material. The rapidly exposed material surface caused by the action of the thermal processor enables direct heat transfer to the particles. In addition, the higher air velocity caused by the purging gas improves mass transfer and removes moisture from the thermal processor container.

Also, the radiant heater thermal processor of the present invention may be used in conjunction with a thermal processor having a jacketed container and hollow shafts supporting hollow working tools wherein a heat transfer medium is supplied to the jacketed container and to the hollow spaces of the shafts and working tools to enhance heat transfer to the materials being processed.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views:

FIG. 1 is a plan view of a thermal processor for thermally processing viscous, shear sensitive materials according to the present invention;

FIG. 2 is a schematic side elevational view of the thermal processor according to the present invention as shown in FIG. 1;

FIG. 3 is a cross-sectional view of the thermal processor shown in FIG. 2;

FIG. 4 is a perspective view of a portion of the shaft and working tool of the thermal processor shown in FIG. 2;

FIG. 5 is a cross-sectional view of another embodiment of the thermal processor according to the present invention similar to the view shown in FIG. 3;

FIG. 6 is a cross-sectional view of the shaft and the working tool of the thermal processor of the embodiment of FIG. 5; and FIG. 7 is a cross-sectional view of another embodiment of the shaft and the working tool of the thermal processor of FIG. 5, similar to the view shown in FIG. 6.

Now turning to the drawings, there is shown in FIG. 1 a thermal processor according to the present invention, generally designated 10, which includes an elongated container, designated 12, having two parallel, horizontally spaced apart shafts, designated 14 and 16, longitudinally mounted therein for rotation. A plurality of working tools, generally designated 18, are connected to each shaft 14 and 16 by means of radially extending connecting arms, designated 20. Working tools 18 are radially arranged on the shafts at equal angular displacements over the 360° circumference of the shafts. In addition, shafts 14 and 16 are displaced from one another by 180° so that the respective working tools 18 are likewise displaced by 180°. Shafts 14 and 16 are each mounted for rotation between a pair of bearings, designated 22 and 24, respectively, and are driven by motor 26. Motor 26 drives shafts 14 and 16 counter-rotationally through gear reduction 28, motor coupling 30, bearing 32 and spur gears housed in spur gear housing 34. Where shafts 14 and 16 pass through the end plates of container 12, packings are provided in packing houses, designated 36. Container 12, bearing 32, spur gear housing 34 and motor 26 are all rigidly mounted on a mounting base, designated 38. Bearings 22 for shaft 14 and bearings 24 for shaft 16 may be mounted to the end plates of container 12.

As clearly seen in FIGS. 1 to 3, container 12 is comprised of a trough portion, designated 40, end plates 42 and 44 and cover 46. As seen in FIG. 3, the bottom half of trough 40 is in the form of two intersecting cylindrical chambers having shafts 14 and 16 defining their axial centers. The cylindrical chambers intersect at the area defined by the overlapping of the respective working tools 18 driven by shafts 14 and 16. The lengths of connecting arms 20 are such that tools 18 extend substantially up to the cylindrically shaped bottom of each chamber of container 12 and also substantially up to the shaft carrying the other set of tools 18. Cover 46 for container 12 includes a material feed opening, designated 48, and an air vent, designated 50. A hot air purge inlet, designated 52, may also be provided, as hereinafter described, together with a cyclone, designated 54, at outlet 50. The thermally processed and mixed material is removed from container 12 by means of a slide gate, designated 56, in end plate 44 at the discharge end of container 12.

Heat is supplied to thermal processor 10 by means of a radiant heater, generally designated 58. Although any suitable gas or electric radiant heater may be utilized, including microwave, the most efficient and least expensive to operate are infrared heaters. It has been found that the infrared portion of the electromagnetic spectrum is well suited for drying dewatered waste water sludge such as metal hydroxide sludge from surface finishing and plating operations. As clearly seen in FIGS. 2 and 3, radiant heater 58 may be positioned above trough 40 of thermal processor 10 in an opening 60 in cover 46 so as to irradiate and heat the contents of trough 40. Such a radiant heater may be comprised of infrared rods 62 disposed in heater 58 above trough 40 and a reflector, designated 64, disposed above infrared rods 62 in order to reflect irradiant energy downwardly into trough 40 which would otherwise escape thermal processor 10.

In FIG. 4 there is shown a working tool 18 which is utilized in the thermal processor according to the present invention. Working tool 18 is preferably wedge shaped or triangularly shaped having substantially triangularly shaped sides, designated 66 and 68, respectively, which converge toward each other at their connection with connecting arm 20 and converge toward each other to define a forward or leading edge, designated 70. Forward edge 70 of tool 18 is oriented in the direction of rotational movement of tool 18 in container 12. The bottom surface or face, designated 72, of tool 18 is recessed with respect to the bottom edges of triangularly shaped sides 66 and 68. As clearly seen in FIG. 1, the tools, designated 74, utilized at the ends of shafts 14 and 16 are half wedge shaped for the purpose of scraping material from end plates 42 and 44 and directing the material away therefrom. A sufficient number of working tools 18 are provided on shafts 14 and 16 to scrape the complete inner surface of container 12 by the sweeping action of the tools. As clearly seen in FIG. 4 (as well as FIGS. 6 and 7), the underside or bottom surface 72 of tool 18 is configured to pull material off the container wall due to the air foil like design and action when rotating. This air foil like design and action creates differential pressures or eddy currents between the bottom surface 72 of tools 18 and the wall of container 12 thereby tending to remove material from the wall without compression and undue shear force. The material being processed, when coming in contact with the triangular sides 66 and 68 of working tools 18, is imparted with forces that move the material upward and outward into the zone of interaction defined by the overlapping of the tools carried by the shafts 14 and 16. This results in a vigorous interaction of the material and a tendency to mechanically fluidize the material. Also, with this action and the action of rapidly dividing the material, a reflux or backmixing results which causes material or particles to move from one end of the container 12 to the other end and back in a short period of time. Mechanical forces are applied through working tools 18 to move individual particles and layers of material in oblique directions, the resultant force having component forces exerted in directions circularly, laterally, and towards the center of container 12. The individual material particles are randomly divided by means of working tools 18 which impart varying velocity and velocity paths to the particles so as to promote constant positive recirculation of all particles. Working tools 18 also radially invert the individual particles so as to change their direction, path of travel and velocities so that mechanical shear forces imparted by the working tools, as well as hydraulic shear forces created by the particles in the material slipping on each other by their different velocities are averaged over an extremely short period of time. The mechanical and hydraulic shear forces average and make uniform the shear stresses for each particle whereby, as a result of the uniform work input, uniform temperature gradient, uniform shear stress, a uniform and predictable viscosity throughout the complete batch of shear sensitive material is provided. These combined actions continually expose the surface area of the material particles to the radiant energy emitted by radiant heater 58 for efficient absorption of the electromagnetic waves, which partially penetrate or completely penetrate the particles of material to excite the liquid molecules therein and through this excitation produce heat energy at a high rate.

The retention time of thermal processor 10 can be adjusted merely by throttling the discharge of the material from container 12 by varying the position of the slide gate 56 which can be compared to changing the area of an orifice. Since the material being processed in the thermal processor is rapidly backmixed and mechanically fluidized, as the discharge is throttled, the level or filling degree of material in container 12 rises and this increase in head results in a rate of material flow through the discharge opening of slide gate 56 equal to the feed rate into feed 48 thereby reaching an equilibrium condition and a new retention time. Thus, thermal processor 10 can always be operated at maximum filling degree and maximum utilization of radiant heater 58 regardless of the feed or charging rate.

Drying performance can be increased by the addition of a purge of hot gas such as air through container 12 by introducing the hot gas at inlet 52 and recovering the gas at outlet 50. Such hot gas can be heated to temperatures conventionally used for fluid bed or flash drying, that is up to 1200° F. The rapidly exposed surfaces of the material particles caused by the action of thermal processor 10 enables the high air or gas velocity caused by the purging gas to improve mass transfer of the liquid molecules and removal of the moisture from container 12. The relatively high peripheral speed of working tools 18, with constant impelling and dividing material in the free space of the thermal processor, enhances the diffusion of vapor across a film at the interface of the material particles and the gas in the processor. This results from a reduction of the partial pressure at said interface which improves and enhances mass transfer of the liquid molecules within the material. With rapid mass transfer, moisture from within the material particles to their surfaces, thereby maintaining saturation thereat, the temperature of the material particles will remain constant as moisture evaporates and will remain at the liquid's wet bulb temperature. This evaporative effect enables the efficient and rapid drying of flammable materials such as sawdust or sewage sludge and also permits the drying of low melting point materials wherein the wet bulb temperature of the liquid is below the melting point of the material. This combination of radiant heat and hot gas as heat sources for thermal processor 10 provides rapid, improved and efficient drying for difficult-to-dry and difficult-to-handle materials in general and particularly for metal hydroxide sludges.

In another embodiment, as clearly seen in FIG. 5, container 12 of thermal processor 10 may be provided with jacketed sidewalls, designated 76. Also, shafts 14 and 16 as well as tools 18 and arms 20 (see FIGS. 6 and 7) may be hollow for acceptance of a heat transfer medium. The heat transfer medium may be introduced into shafts 14 and 16 by means of rotary pressure joints, designated 78, shown in phantom in FIG. 1 and located at the discharge end of container 12. Such rotary pressure joints include rotary siphons for the removal of the heat transfer medium after utilization. The heating medium may be introduced to the jacketed sidewalls 76 of container 12 at an inlet 80 shown in phantom in FIG. 1 which, if the heating medium is a liquid, is positioned at a low point in container 12 and the heating medium is recovered at discharge 82 also shown in phantom in FIG. 1 and positioned near the upper end of container 12. In the event the heating medium is steam, it may be introduced to the jacketed wall 76 of container 12 at any position thereon through inlet 80 and the condensate recovered at the bottom thereof by means of steam traps 84 shown in phantom in FIG. 2.

As clearly seen in FIG. 6, when the heat transfer medium is in the form of a fluid, each of the shafts 14 and 16 are diametrically partitioned by a partition 86 which, because of the radial placement of working tools 18, is in the form of a long helix. Connecting arms 20 of working tools 18 are formed of two adjacent pipes, designated 88 and 90, each of which communicates with the shaft on a respective side of partition 58 via openings 92 and 94, respectively. In this manner, the heat transfer fluid is circulated through shafts 14 and 16, connecting arms 20 and working tools 18 by being fed to one-half of each divided shaft, through opening 92, into pipe 88 of connecting arm 20 and working tool 18. In its return, the heat transfer fluid flows out of working tool 18, into pipe 90 of connecting arm 20 and back into the return portion of the shaft via return opening 94.

In FIG. 7 there is shown a shaft and working tool configuration which is utilized when the heat transfer medium is a vapor such as steam. In this event, it is unnecessary for the shaft to have a separating partition therein as in the case of the embodiment of FIG. 6 where a liquid heat transfer medium is utilized. Thus, as clearly seen in FIG. 7, the heat transfer vapor occupies the hollow portions of shafts 14 and 16, connecting arms 20' and working tools 18. As the heat is transferred from the vapor to the material being processed, the vapor condenses in these chambers. The condensate in each working tool 18 flows through pipe 90' of connecting arm 20' into the hollow shaft. The pipes 88' and 90', forming connecting arm 20', are inserted into the hollow portion of the shaft to a sufficient extent to prohibit the condensate in the shaft from flowing back into working tool 18 when the tool is at its bottom-most position. On the other hand, as working tool 18 moves in its vertical position, the condensate collected therein flows toward the drive shaft through pipe 90' of connecting arm 20' as a result of the force of gravity. In this case it is to be noted that the rotational speed of shafts 14 and 16, and thus of working tools 18, is sufficiently low to permit this flow of condensate without centrifugal force causing a problem in this respect. The condensate accumulated in the rotating shafts is removed therefrom through the rotating siphon which forms part of the rotating pressure joint 78 for each shaft 14 and 16.

The thermal processor 10 according to the present invention can also be utilized as a pre-dryer for conventional dryers such as flash dryers, fluid bed dryers and rotary dryers. The ability of the thermal processor to rapidly and uniformly incorporate returned dry material to blend with incoming wet materials, commonly called backmixing, enables its use as a combined backmixer and pre-dryer. In this manner, two pieces of capital equipment, i.e. backmixing equipment and return conveyor for returning dry material to the backmixer can be eliminated. This results in the utilization of less floor space because of the efficiency of such pre-dryers to pre-condition large volumes of material for the second, conventional drying step. The rapid blending of dry material with wet material aids in exposing the wet particle surface area of the wet material to heat. Also, rapidly providing the sensible heat by means of radiant energy brings the material up to evaporation temperatures prior to discharging into conventional drying equipment.

Thermal processor 10 can be fabricated for either batch or continuous operation. For batch operation, discharge gate 56 is closed to retain material within container 12 for a specific period of time to accomplish drying, after which it is discharged. For continuous operation, material is charged at one end of container 12 through feed 48 and retained for a specific period of time. This retention time is governed by adjustment of the discharge gate 56 which throttles the material throughput as described above.

Thermal processor 10 can also be fabricated for operation under vacuum. As in conventional vacuum drying, the evaporation of moisture under vacuum is at lower boiling point temperatures, otherwise the drying principles as described hereinabove are the same.

It is understood that the foregoing general and detailed descriptions are explanatory of the present invention and are not to be interpreted as restrictive of the scope of the following claims.

What is claimed is:

1. In a system handling dewatered waste water sludge from industrial plants, a thermal processor comprising:
   (a) an elongated container for containing said materials being processed;
   (b) two parallel, horizontally spaced apart shafts disposed longitudinally in said container;
   (c) means for rotating said shafts oppositely to one another in said container;
   (d) a plurality of working tools mounted on said shafts, each tool comprising two substantially triangularly shaped sides converging toward each other at their connection to the shaft and converging toward each other to define a forward edge in the direction of rotation of said tool thereby defining a double wedge shape, the bottom face of said tool being recessed from the bottom edges of said sides, said tools being mounted to said shafts so that the tools extend substantially up to the bottom of said container and so that the paths of travel of the tools of one shaft come in proximity to the other shaft so as to create an overlapping zone of interaction between the respective tools of said shafts for the rapid impelling and dividing of the material being processed; and
   (e) radiant heating means comprising an infrared heater for supplying radiant heat energy to the material being processed in said container the particulate surface of which is continually exposed thereto by the action imparted by the plurality of working tools so that the particles of said material efficiently absorb the radiant heat energy supplied by said radiant heating means to evaporate the liquid therein.

2. The thermal processor as defined in claim 1, which further includes means for introducing a hot gas purge to said container so as to contact the material being processed therein and remove therefrom by evaporation the liquid in said material.

3. The thermal processor as defined in claim 2, wherein said hot gas purge is introduced into said container at an end thereof where said material is fed thereto and removed from the other end of said container.

4. The thermal processor as defined in claim 3, wherein the gas purge outlet from said container further includes a cyclone to separate the material particles from the exhausted gas.

5. The thermal processor as defined in claim 1, which further includes a reflecting element in said infrared heater for reflecting the heat energy therefrom into said container.

6. The thermal processor as defined in claim 1, wherein said working tools on each shaft are arranged along the 360° circumference of the shaft at equal angular displacements and each shaft is displaced from the other by 180°.

7. The thermal processor as defined in claim 1, wherein said container comprises two cylindrically shaped chambers which intersect between the axes of said shafts to form the bottom of said container, the axes of said shafts being disposed along the axes of said cylinders, and said working tools extending from said shafts toward and substantially up to the bottom of said cylindrical chambers.

* * * * *